(12) United States Patent
Teraoka

(10) Patent No.: US 7,069,847 B2
(45) Date of Patent: Jul. 4, 2006

(54) OVERLOAD PROTECTION CONTROL METHOD FOR PRESSING MACHINE

(75) Inventor: Kenichi Teraoka, Kanazawa (JP)

(73) Assignees: Komatsu Ltd., Tokyo (JP); Komatsu Industries Corp., Tokyo (JP)

( * ) Notice: Subject to any disclaimer, the term of this patent is extended or adjusted under 35 U.S.C. 154(b) by 162 days.

(21) Appl. No.: 10/252,812

(22) Filed: Sep. 23, 2002

(65) Prior Publication Data

US 2003/0066323 A1    Apr. 10, 2003

(30) Foreign Application Priority Data

Oct. 10, 2001  (JP)  ............................. 2001-313317

(51) Int. Cl.
*B30B 13/00*   (2006.01)

(52) U.S. Cl. ..................... 100/35; 100/43; 100/346

(58) Field of Classification Search ............... 100/43, 100/48, 52, 341, 346, 99, 274, 257, 35; 72/1, 72/21.1, 21.3–21.5, 3, 4, 473; 192/129 A, 192/130, 150; 425/154; 83/530, 543, 563
See application file for complete search history.

(56) References Cited

U.S. PATENT DOCUMENTS

| 3,824,821 | A | * | 7/1974 | Bergmann et al. ............ 72/14.9 |
| 5,172,630 | A | * | 12/1992 | Thompson ................... 100/193 |
| 5,199,290 | A | * | 4/1993 | Kashiwagi et al. .......... 72/15.2 |
| 5,669,257 | A | * | 9/1997 | Inoue et al. ................. 72/20.1 |
| 6,012,322 | A | * | 1/2000 | Itakura ........................ 72/450 |
| 6,012,370 | A | * | 1/2000 | Kobayashi ................... 83/543 |
| 6,520,077 | B1 | * | 2/2003 | Minagawa et al. ......... 100/289 |
| 6,619,088 | B1 | * | 9/2003 | Oyamada et al. ............ 72/17.2 |

FOREIGN PATENT DOCUMENTS

JP    61-24392 Y2    7/1996

* cited by examiner

*Primary Examiner*—Derris H. Banks
*Assistant Examiner*—Jimmy T. Nguyen
(74) *Attorney, Agent, or Firm*—Frishauf, Holtz, Goodman & Chick, P.C.

(57) ABSTRACT

An overload protection control method for a pressing machine capable of performing overload protection with excellent responsiveness with a simple structure is provided. For this purpose, the overload protection control method includes the steps of driving a slide (4) to reciprocate via a mechanical power transmission mechanism (3) by a servo motor (21), and raising the slide (4) by the servo motor (21) when detecting overload on the slide (4) during pressurization.

3 Claims, 4 Drawing Sheets

OVERLOAD PROTECTION CONTROL METHOD FOR PRESSING MACHINE

TECHNICAL FIELD

The present invention relates to an overload protection control method for a pressing machine.

BACKGROUND ART

An overload protector, which determines abnormal overload when overload of a predetermined load or more is exerted on a slide during pressurization with the slide of a pressing machine, and operates to allow the slide escape upward, is conventionally used. Here, as "a predetermined load or more", for example, the case in which the load exceeds 10% or more of a rated load is cited. As the overload protector, the one disclosed in, for example, Japanese Utility Model Application Publication No. 61-24392 is known, and FIG. 4 shows an overload protector disclosed in Japanese Utility Model Application Publication No. 61-24392. In FIG. 4, a connecting rod 7 is connected to a plunger 19, which is provided at a frame 2 to be vertically movable, with a pin 8, and a step portion 19b is formed between a small diameter portion 19a formed at a lower part of the plunger 19 and an upper part of the plunger 19.

The lower part of the plunger 19 and the small diameter portion 19a are fitted in an upper hole of a slide 4, and an oil chamber 50 is formed between the step portion 19b of the plunger 19 and a step portion of the upper hole of the slide 4. An adjust screw 41 is screwed in the small diameter portion 19a from a lower surface to an upper position, and a gear 42 is formed at a lower part of the adjust screw 41. The gear 42 is meshed with a pinion 44 of a slide adjusting motor 45 attached to the slide 4 via an intermediate gear 43. The oil chamber 50 communicates with a port 51c of a change-over valve 51 via a conduit line 56. A port 51a of the change-over valve 51 is connected to a discharge side of a pump 52 via a check valve 58, and a port 51b of the change-over valve 51 communicates with a tank 57 via a check valve 55 which opens at set pressure. Further, the port 51c communicates with the tank 57 via an overload valve 53 and a check valve 54.

When the press is not pressurized, the change-over valve 51 is normally in a position a, and discharge oil from the hydraulic pump 52 enters the oil chamber 50 via the check valve 58, thus exerting constant preload pressure on the oil chamber 50. Pressing force at the time of driving the slide is transmitted to the slide 4 from the connecting rod 7 and the plunger 19 via oil pressure of the oil chamber 50. When overload is exerted on the slide 4, the oil pressure in the oil chamber 50 becomes predetermined pressure or more, and oil inside the oil chamber 50 escapes into the tank 57 via the overload valve 53, and the slide 4 escapes upward. At the time of adjustment of the slide, the change-over valve 51 is switched into a position b, and the oil pressure inside the oil chamber 50 is made lower than the aforementioned preload pressure, whereby load at the time of driving the slide adjusting motor 45 is reduced.

However, in the conventional hydraulic type of overload protector as described in the above-described Japanese Utility Model Application Publication No. 61-24392, overload is detected by utilizing a pressure change in the oil chamber 50 at the time of pressurization of the slide, and when the pressure of the oil chamber 50 rises to set pressure or more, oil in the oil chamber 50 is allowed to escape by means of the overload valve 53. Accordingly, due to a delay time in response of the hydraulic circuit thereof, a delay occurs before the slide 4 actually escapes upward, and thus it sometimes happens that overload protection does not sufficiently function when the slide 4 is operated at a high speed. Further, since the above-described load protector is installed, the number of components becomes larger, and an installation space is needed, which causes the disadvantage of raising the cost by that amount.

SUMMARY OF THE INVENTION

The present invention is made in view of the above-described disadvantage, and has its object to provide an overload protection control method for a pressing machine, which is capable of performing overload protection with excellent responsiveness with a simple structure.

In order to attain the above-described object, an overload protection control method for a pressing machine according to the present invention has the constitution including the steps of driving a slide to reciprocate via a mechanical power transmission mechanism by a servo motor, and raising the slide by the servo motor when detecting overload on the slide during pressurization.

According to the above constitution, when overload is detected at the time of pressurization, the slide is reversed to be raised by the servo motor which drives the slide. Since responsiveness and slide raising speed of the drive control by the servo motor is higher than the control using oil pressure, overload protection can be performed by drive of the servo motor. Accordingly, a hydraulic overload protector as in the prior art is not needed, and therefore the number of components is made smaller, thus making it possible to reduce the size of the pressing machine and produce it at low cost. Further, even if abnormal overload occurs at any position of the slide stroke, the protection function immediately works, and therefore the metal mold can be surely protected.

BEST MODE FOR CARRYING OUT THE INVENTION

A preferred embodiment according to the present invention will be explained in detail below with reference to the drawings.

Figure 1:
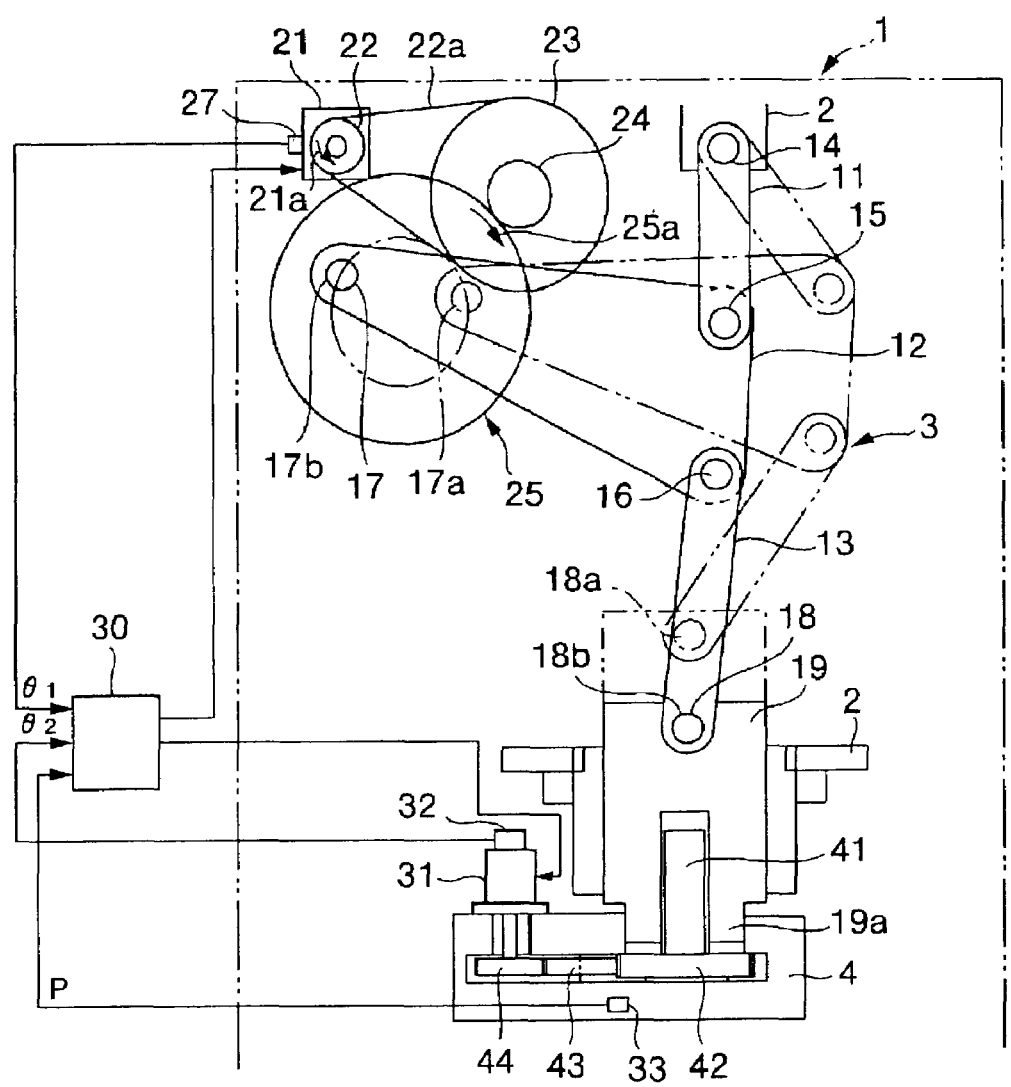
FIG. 1 is a schematic block diagram of an embodiment according to the present invention.

FIG. 1 is a schematic block diagram of this embodiment. In FIG. 1, a slide 4 and a plunger 19 of a pressing machine 1 are supported by a main body frame 2 to be vertically movable, and the slide 4 and the plunger 19 are fitted in each other at a lower protruding portion 19a of the plunger 19 to be vertically slidable. A screw portion of an adjust screw 41 provided at the slide 4 is screwed in a female screw portion formed in a lower portion of the plunger 19. An upper portion of the plunger 19 is connected to the main body frame 2 via a link mechanism 3. Namely, one end of a first link 11 is rotatably connected to an upper portion of the main body frame 2 with a pin 14, and the other end is connected to one end of both end portions of one side of a triangle link 12 with a pin 15. The other end of both the end portions of the aforementioned one side of the triangle link 12 is connected to one end of a second link 13 with a pin 16, and the other end of the second link 13 is connected to the upper portion of the plunger 19 with a pin 18. These first link 11, the triangle link 12 and the second link 13 constitute the link mechanism 3.

A first pulley 22 is attached to an output shaft of a servomotor 21 for driving the slide (motion control), and a timing belt 22a is placed across a second pulley 23, which is rotatably supported at the main body frame 2, and the first pulley 22. A first gear 24 is attached on the same axis as the second pulley 23, and a second gear 25 meshed with the first gear 24 is rotatably supported at the main body frame 2. A pin 17 at the other end, which opposes the one side between the pins 15 and 16 of the triangle link 12, is rotatably connected at an eccentric position of the second gear 25. By conducting rotation control of the servo motor 21, a rotation angle of the second gear 25 is controlled, and the plunger 19 and the slide 4 are reciprocated in a vertical direction via the link mechanism 3 such as the triangle link 12.

A gear 42 is attached at a lower end portion of the adjust screw 41 provided at the slide 4, and the gear 42 is meshed with a pinion 44 fitted onto an output shaft of a servo motor 31 for adjusting die height, which is attached to the slide 4, via an intermediate gear 43.

Control command signals are inputted from a controller 30 to the aforementioned servo motor 21 for driving the slide (motion control) and the servo motor 31 for adjusting die height, respectively. Position detection signals θ1 and θ2 of position sensors 27 and 32 provided at both the servo motors 21 and 31 are inputted into the controller 30. The position sensors 27 and 32 are constituted by, for example, pulse encoders or the like. A load sensor 33 constituted by a distortion sensor or the like is attached to the slide 4, and a load value P detected by the load sensor 33 is inputted in the controller 30.

The controller 30 is constituted by a high speed operation unit such as a microcomputer and a high speed numeric operation processor, and has a memory for storing a predetermined control parameter, control target data and the like. For example, set means (not shown) is included to set a slide position and slide speed in one cycle according to a type of machining of a work and a machining condition of the work, and the set slide control pattern is stored in the aforementioned memory. Here, as the types of machining, there are molding, drawing, punching, marking and the like, and as the work machining conditions, there are plate thickness, molding shape, slide SPM and the like. Before a work is actually machined under the above-described set condition, accuracy of the product, which is machined by trial pressing in advance, is measured, then a target load corresponding to a die height amount which makes optimal accuracy is obtained, and the target load is stored in the aforementioned memory.

Next, an operation at the time of driving the slide 4 via the link mechanism 3 will be explained.

When the servo motor 21 is rotated in the direction of the arrow 21a shown in the drawing, the speed is reduced via the pulleys 22 and 23 and the gears 24 and 25, and the pin 17 of the triangle link 12 is rotated in the direction of the arrow 25a. When the pin 17 is at a position 17a (corresponding to the triangle link 12 shown by the two-dot chain line), the position of the pin 18 at the upper portion of the plunger 19 is set at a position 18a corresponding to a top dead center of the slide 4. When the pin 17 is at the position 17b (corresponding to the triangle link 12 shown by the solid line), the position of the pin 18 is set at a position 18b corresponding to a bottom dead center of the slide 4. Following the above-described rotation of the pin 17, the pin 18 reciprocates between the position 18a and the position 18b, whereby the plunger 19 and the slide 4 can reciprocate between the bottom dead center position and top dead center position. By continuously rotating the servo motor 21 in the same direction, the slide 4 can be continuously operated.

Figure 2:
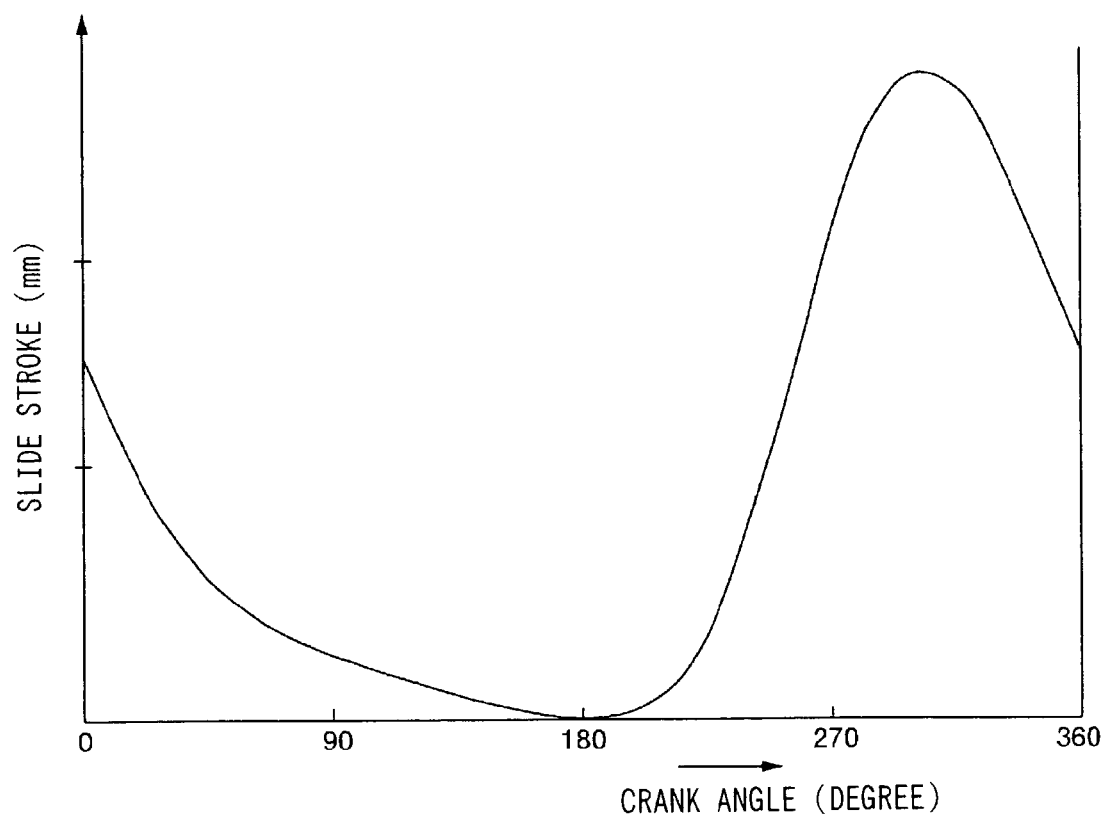
FIG. 2 is an example of a slide motion in the embodiment.

At the time of actual machining, the rotation angle and the speed of the servo motor 21 is controlled by the controller 30 based on a previously set control pattern, whereby a slide motion corresponding to the pattern is realized. The slide motion is shown in, for example, FIG. 2. Here, in FIG. 2, a horizontal axis represents a crank angle in the control, a time axis of one cycle of the slide motion is shown by being brought into correspondence with 0 degree to 360 degrees of the crank angle in the conventional mechanical link press. A vertical axis represents a slide stroke (moving distance).

The controller 30 brings the horizontal axis of the slide motion to be controlled into correspondence with one cycle time corresponding to the slide SPM, and a slide stroke position corresponding to each point of the time axis in a slide uniform operation is obtained based on the above-described slide motion. Subsequently, the controller 30 sets a motor rotation angle which realizes the obtained slide stroke position as a target position. Then, the controller 30 arithmetically operates a control command value so that a deviation value between the target position and the position detection signal θ1 from the position sensor 27 becomes small, and the controller 30 controls the rotation angle of the servo motor 21 according to the arithmetically operated control command value. Such control is repeated for each cycle of the slide motion in succession, whereby motion is realized.

Meanwhile, when the servo motor 31 for adjusting die height is rotated, the adjust screw 41 is rotated via the pinion 44, and gears 43 and 42, and the slide 4 vertically moves, whereby the die height is adjusted. At the time of actual machining, the controller 30 has the load value inputted from the load sensor 33 during pressurization of the slide, and obtains a load maximum value Pmax at the slide stroke. The controller 30 adjusts the die height by the servo motor 31 based on the comparison of the load maximum value Pmax and a target load value p0 that is previously stored.

In the present invention, the components of the die height adjust device and the adjusting method are not limited to the above-described embodiment. Accordingly, adjusting drive means may be constituted by a hydraulic motor and a gear, or rotation drive means by a cylinder device and a gear, and the adjustment timing may be at each slide stroke, at the stage replacing time, during stoppage of the slide, or during driving of the slide.

Figure 3:
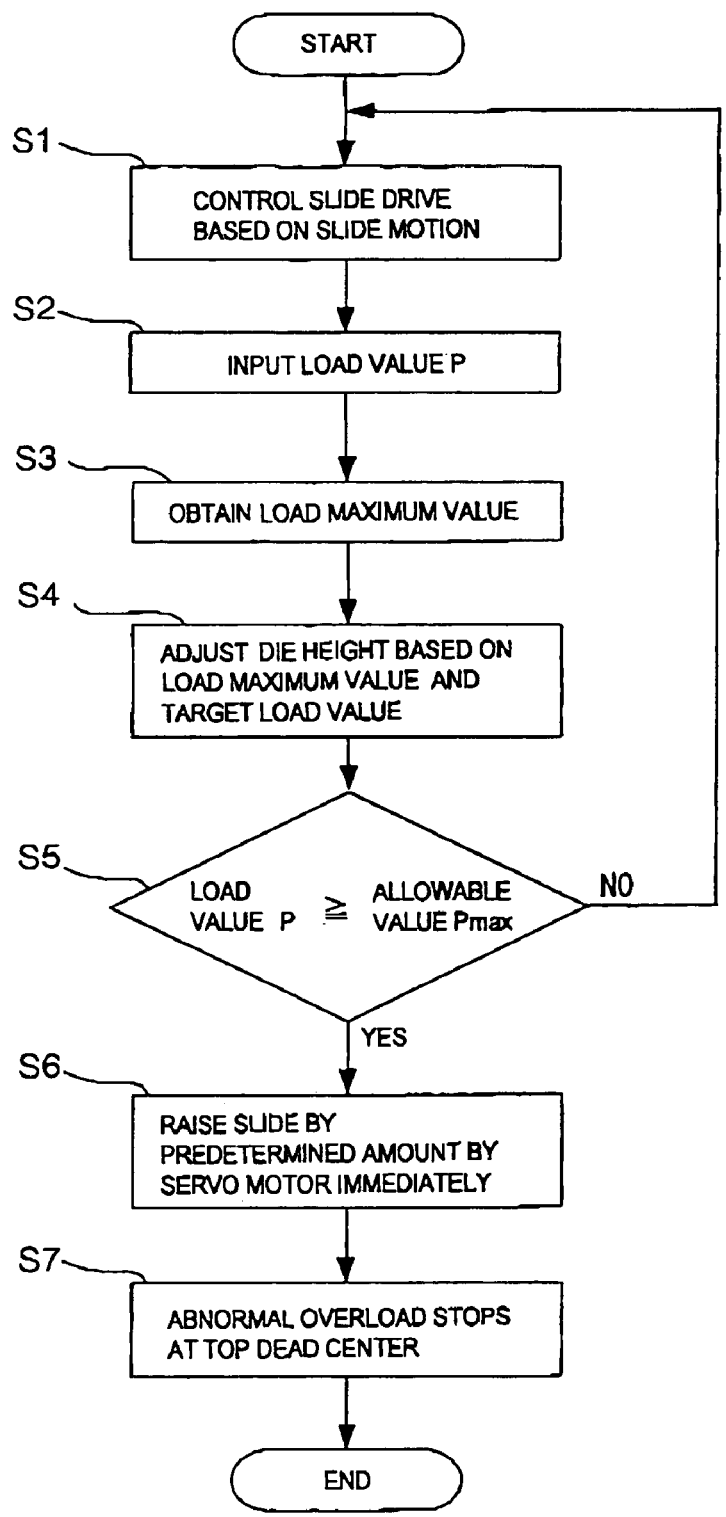
FIG. 3 is a control flowchart of overload protection according to the embodiment.
Figure 4:
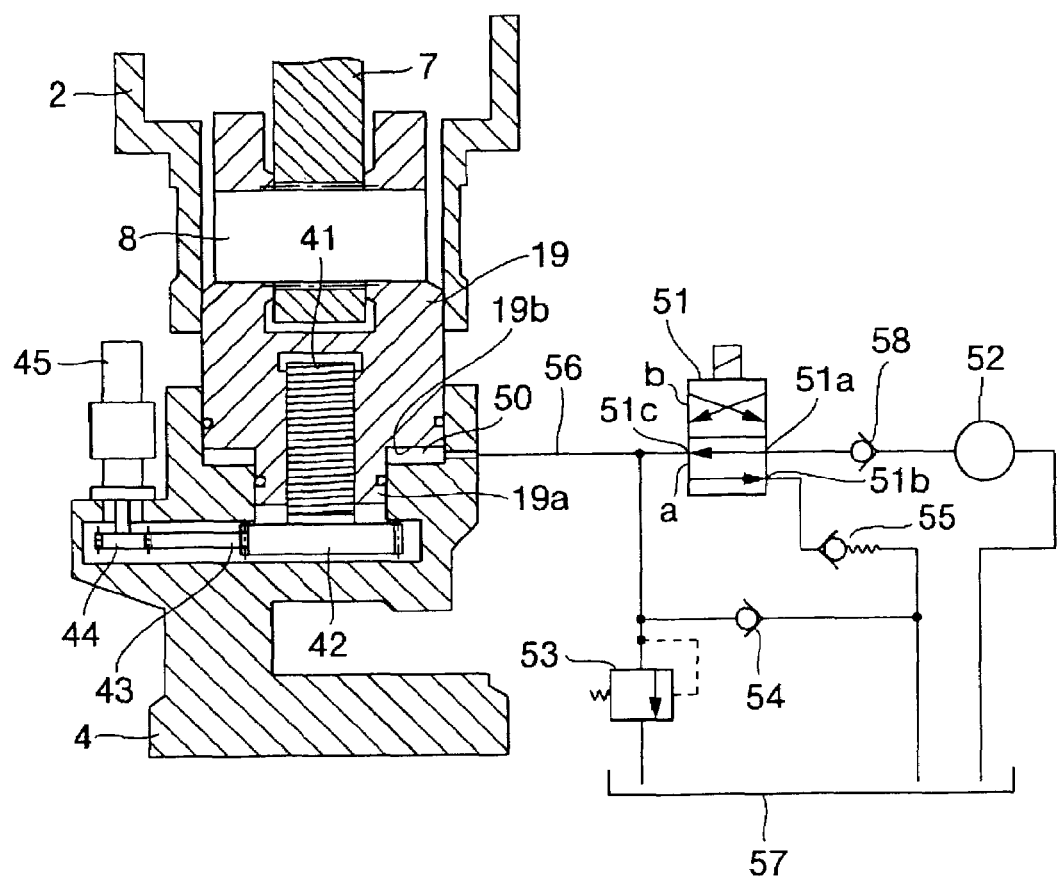
FIG. 4 is an explanatory view of a conventional overload protector.

Next, a procedure of the overload protection will be explained based on a control flowchart shown in FIG. 3.

In step S1, the drive of the slide 4 is controlled by the servo motor 21 based on the slide motion. Next, in step S2, a load value P at the time of pressurization is inputted from the load sensor 33. In step S3 the load maximum value Pmax is obtained, and in step S4 the die height is adjusted based on the load maximum value and the target load value, as described above. In step S5, it is checked whether the load value P is the allowable value Pmax or more. When the load value P is not the allowable value Pmax or more, a command is given to return to step S1 to repeat the above process. When the load value P is the allowable value Pmax or more, the slide 4 is immediately raised by a predetermined amount α by the servo motor 21 in step S6. Thereafter in step S7, the slide 4 is returned to the top dead center and is stopped due to abnormal overload, and a notice of the occurrence of the abnormal overload is sent to an operator by means of an indicator (not shown) or the like.

Next, the effects of the embodiment will be explained.

(1) When overload of an allowable value or more is exerted on the slide 4 during pressurization of the slide, the servo motor 21 for controlling the slide motion is immediately driven inversely to raise the slide 4 by the predetermined distance α. Since the responsiveness of the servo motor control is excellent, the slide 4 can be raised by a predetermined amount in a short time, and therefore a metal mold can be protected from overload even at the time of a pressing operation at high stroke per minute. Further, since the servo motor 21 for a slide motion control is also used for the overload protection, a special overload protector as in the prior art is not needed, thus making it possible to reduce the machine in size and construct it at low cost.

(2) Since the servo motor 21 for slide motion control is used for driving the slide and overload is detected by the load sensor 33, overload protection is performed with excellent responsiveness even if an abnormal overload occurs at any position during stroke of the slide 4, and therefore the metal mold can be surely protected.

The components explained in the above-described embodiment is only one example, and it goes without saying that other constitution may be used if only the constitution can attain the technical idea of the present invention. For example, as the power transmission means to convert the rotational power of the servo motor 21 into a slide reciprocating motion, the example using the link mechanism 3 is shown, but this is not restrictive, and a ball screw mechanism, an eccentric mechanism or the like may be used. As the load sensor 33, a pressure sensor, or a drive current sensor for the servo motor 21 may be used. Further, the rotation sensor 27 for the servo motor 21 for slide motion control is not limited to a rotating type, but may be a linear type sensor (linear sensor and the like). Further, the servo motor 21 does not need to rotate in one direction all the time while the slide is reciprocating, and it may repeats, for example, normal and reverse rotation.

According to the present invention explained thus far, the following effects can be provided.

(1) Since the servo motor is immediately driven inversely to raise the slide by a predetermined amount when overload of an allowable value or more is exerted on the slide, it is possible to raise the slide in a short time, and protect the metal mold from the overload. The servo motor for slide motion control is used for overload protection, thus requiring less components, and the protector can be constructed at low cost.

(2) The servo motor for slide motion control is used, and therefore overload protection can be performed with excellent responsiveness even if an abnormal overload occurs at any position during slide stroke, thus making it possible to perform protection with reliability.

What is claimed is:

1. An overload protection control method for a pressing machine, the method comprising:
   driving a slide to reciprocate via a mechanical power transmission mechanism powered by a servo motor;
   pressurizing the slide;
   detecting a load value on the slide;
   determining whether the load value is greater than a predetermined maximum load value;
   raising the slide by a predetermined amount by the servo motor when the detected load value is determined to be greater than the maximum load value; and
   indicating occurrence of an abnormal overload when the detected load value is determined to be greater than the maximum load value.

2. The overload protection control method according to claim 1, wherein after the slide is raised by the predetermined amount, the slide is raised to top dead center, and the occurrence of the abnormal overload is indicated.

3. An overload protection control method for a pressing machine, the method comprising:
   driving a slide to reciprocate via a mechanical power transmission mechanism powered by a servo motor;
   pressurizing the slide;
   detecting a load value on the slide;
   obtaining a maximum load value at a slide stroke;
   adjusting a die height via a die height adjustment motor based on the maximum load value and a predetermined target load value;
   determining whether the load value is greater than the maximum load value; and
   raising the slide by the servo motor when the detected load value is determined to be greater than the maximum load value.

* * * * *

UNITED STATES PATENT AND TRADEMARK OFFICE
CERTIFICATE OF CORRECTION

PATENT NO. : 7,069,847 B2
APPLICATION NO. : 10/252812
DATED : July 4, 2006
INVENTOR(S) : Kenichi Teraoka It is certified that error appears in the above-identified patent and that said Letters Patent is hereby corrected as shown below:

In the Title Page:

Item (56) References Cited - FOREIGN PATENT DOCUMENTS, delete "7/1996" and insert --7/1986--.

Signed and Sealed this

Tenth Day of July, 2007

JON W. DUDAS
*Director of the United States Patent and Trademark Office*